Figure 1:
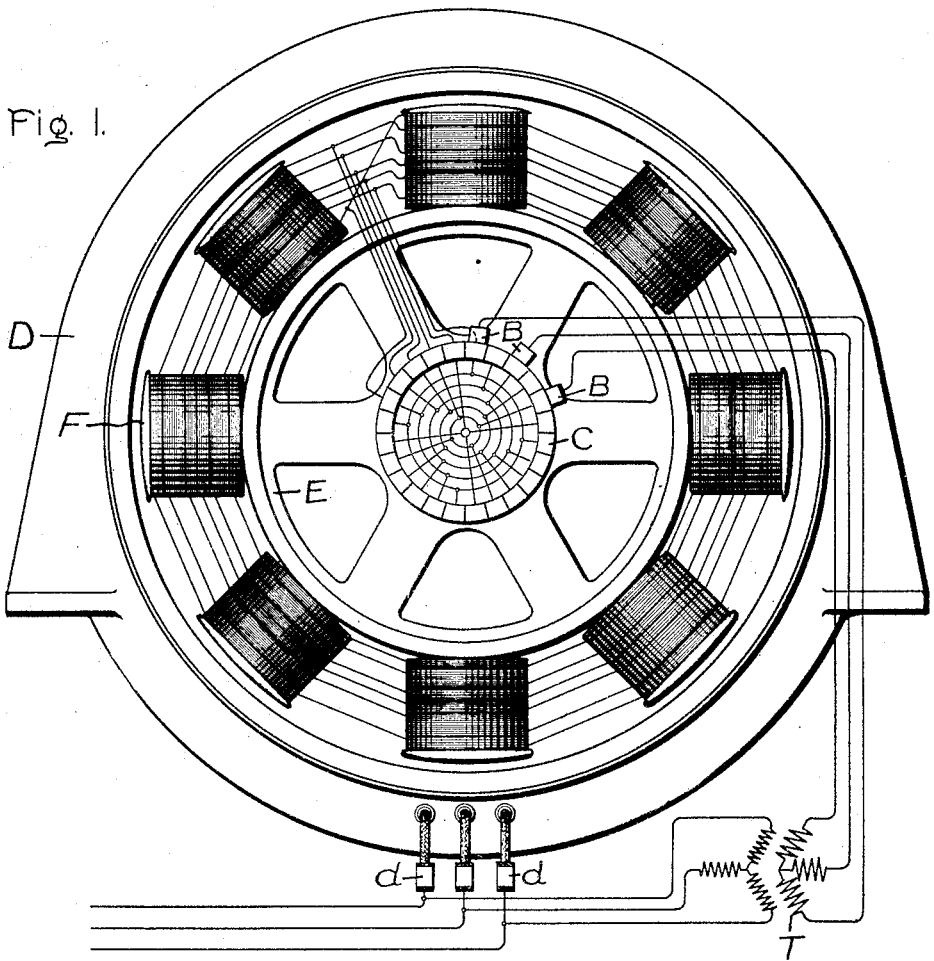

No. 789,436. PATENTED MAY 9, 1905.
M. C. A. LATOUR.
DYNAMO ELECTRIC MACHINE.
APPLICATION FILED SEPT. 10, 1904.

Witnesses.
Elnathan E. Briggs.
Allen Orford.

Inventor:
Marius C.A. Latour
by Albert G. Davis
Att'y.

No. 789,436. Patented May 9, 1905.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

DYNAMO-ELECTRIC MACHINE.

SPECIFICATION forming part of Letters Patent No. 789,436, dated May 9, 1905.

Application filed September 10, 1904. Serial No. 223,942.

*To all whom it may concern:*

Be it known that I, MARIUS C. A. LATOUR, a citizen of France, residing at Paris, France, have invented certain new and useful Improvements in Dynamo-Electric Machines, of which the following is a specification.

My invention relates to dynamo-electric machines; and its object is to provide a novel arrangement for producing a unidirectional constant flux in a magnetic circuit by means of alternating currents, and more specifically to enable an alternating-current generator thereby to excite its own field-magnet with currents derived from the armature.

My invention is based on the mathematical truth expressed by the equation $$-\sin^2 a + \cos^2 a = 1.$$

An application of this formula has been made by Hutin and Le Blanc in the invention disclosed in their Patent No. 572,510, issued December 1, 1896. In this patent they show means for converting alternating currents into direct current, as follows: By means of the alternating current a sinusoidal flux is produced in a magnetic circuit, thereby inducing a sinusoidal electromotive force in a secondary winding caused by said magnetic circuit, and the number of effective turns of that secondary winding is simultaneously varied in accordance with the same sine function as that by which the electromotive force varies. Since the volts per coil vary with the sine function and since the number of coils in circuit vary with the same sine function, the resultant electromotive force varies as a $\sin^2$ function. By similarly producing in a second winding a voltage varying as a co-$\sin^2$—as, for instance, by exciting it by means of a flux displaced ninety degrees from that which excites the first winding—and also by varying the effective turns in accordance with the cosine function, and by connecting the two windings in series the electromotive forces are added and a resultant constant unidirectional voltage is obtained in accordance with the formula. Furthermore, it is shown in the above-mentioned patent that the theory is not limited to the combination of the squares of two sinusoidal function differing in phase by ninety degrees, but is applicable in general to any polyphase arrangement. By connecting in series any number of voltages each varying as the $\sin^2$ of the phase angle of one of a number of phases a constant unidirectional voltage will be obtained.

By my invention I make a novel application of the theory briefly outlined above and disclosed in full in the patent referred to. By my invention a number of superimposed fluxes are produced in a single magnetic circuit, each flux varying as a $\sin^2$ of the phase angle of one of a plurality of phases. In accordance with the theory I thereby obtain a constant unidirectional flux which may be utilized for the same purposes as a similar flux as ordinarily produced by direct current. Thus, for instance, by means of my invention the field-magnet of an alternating-current generator or motor may be excited with a constant unidirectional flux by means of currents taken from the armature-circuit, and the machine may be made self-exciting or self-compounding, or both.

My invention then consists in the combination, with a magnetic circuit, of means for producing a plurality of superimposed fluxes, each varying with the $\sin^2$ function of the phase angle of one of a number of phases.

More specifically considered, my invention consists in the combination, with a magnetic circuit, of a winding or windings thereon, of means for impressing upon said winding or windings polyphase voltages, and of means for simultaneously varying the effective number of turns connected to each phase of the voltage in accordance with the variation of the sine of the phase angle of said voltage.

My invention further consists in a novel arrangement of the several sections of each winding or windings whereby the ohmic resistance in circuit with the exciting voltage is maintained at all times constant.

My invention further consists in the application of the above arrangement to the excitation of alternating-current dynamo-electric machines.

My invention will best be understood by reference to the accompanying drawings, in which—

Figure 2:
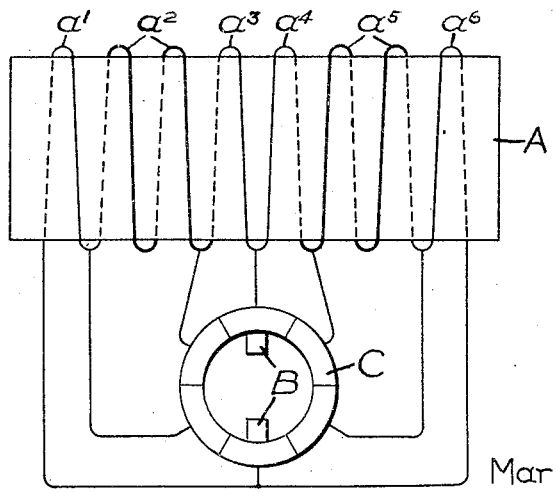

Figure 1 shows somewhat diagrammatically an alternating-current dynamo-electric machine provided with a field excitation in accordance with my invention, and Fig. 2 is an explanatory diagram.

Referring first to Fig. 2, A represents a portion of a magnetic circuit, on which is placed a winding formed in a number of sections $a'$ to $a^6$, one half of the sections being wound oppositely to the other half and the whole connected in a closed winding. The closed winding formed by these sections is tapped at points between adjacent sections to the segments of a six-part commutator C. B B represent revolving brushes bearing in the commutator. Evidently the number of effective turns of the winding connected in circuit with the brushes will vary during the rotation of the brushes. Considering the number of turns in each section, it will be remembered that in order to obtain a sinusoidal variation of the number of effective turns in a circuit the successive coils or sections should contain a number of turns as set forth in the patent above referred to by the following expressions:

Number of turns in first coil $= k \sin. a$.

Number of turns in second coil $= k \sin. a + \frac{2\pi}{n}$.

Number of turns in third coil $= k \sin. a + \frac{4\pi}{n}$, &c., $k$ being a constant and $n$ being the number of coils.

Now in order to take a simple example let $a = \frac{\pi}{n}$, $n = 6$, and $k = 2$. Substituting these values in the expressions given above, the number of turns in each coil or section will be as follows: 1, 2, 1, −1, −2, −1. It is this arrangement that is shown in Fig. 2, the negative signs being taken care of by reversing the direction of these sections. Of course in order to get a close approximation to a sine function a greater number of sections should be selected; but the arrangement shown will serve for the purpose of illustration. It will be seen that the two sections of two turns each are shown in heavier lines than the other sections. The purpose is to indicate that the turns are of greater cross-section. The several sections are preferably so wound that the resistances of all the sections are approximately equal, so that the ohmic resistance of the circuit will not be varied as the brushes B B revolve on commutator C.

Now if the brushes B B are placed, as shown, on the commutator it will be seen that the current entering and leaving the brushes divides, half going through each half of the section and the current in all the sections assisting in producing the magnetization—that is, the total number of ampere-turns is equal to 4 I, I being the current entering at the brushes. If this current is an alternating current, the ampere-turns at any instant will be equal to 4 I sin. $a$, where I is the maximum value of the current entering the brushes. Now if the brushes B B are revolved in synchronism with the alternation of the currents entering the brushes the effective number of turns traversed by the current entering the brushes will also vary, as sin. $a$, and the resultant ampere-turns at any instant may be expressed by 4 I sin.$^2$ $a$. Now if a second pair of brushes were placed on the commutator displaced ninety degrees from the brushes B B and if a current were sent through this second set displaced in phase ninety degrees from the current sent through the brushes B B a second flux would be produced corresponding to the ampere-turns, the effective value of which at any instant would be equal to 4 I cos.$^2$ $a$, and the resultant would be equal to 4 I—that is, the flux would be constant and unidirectional, and, in general, if any polyphase arrangement of brushes is employed on the commutator C and if polyphase currents are supplied to those brushes of a frequency corresponding to the speed of relative rotation of brushes and commutator a constant unidirectional flux will be produced in the magnetic circuit A. Furthermore, it is not essential that polyphase currents should be supplied to the commutator. If the second set of brushes, as described above, be simply short-circuited instead of being connected to a source of current displaced ninety degrees in phase, a current will flow through the short circuit, due to the induction in the exciting-winding, and the magnetomotive force due to this current will vary approximately with the square of a sine function and, with the magnetomotive force due to the current impressed upon the first set of brushes, will produce a substantially constant unidirectional flux, though this arrangement is not as efficient as a polyphase excitation. For producing such a flux it is merely essential that the necessary component magnetomotive forces, each varying as the square of a sine function, should be produced, and the source of the current which produces them is immaterial.

Now referring to Fig. 1, the application of my invention to a self-exciting or self-compounding dynamo-electric machine will be explained. In this figure, D represents the armature of a three-phase machine, the terminals being represented at $d$. E represents the field-spider carrying the field-coils F and the commutator C, on which bear the three brushes B B B, displaced from each other by one hundred and twenty electrical degrees. The winding of each individual field-coil is in six sections corresponding to the six sections shown in Fig. 2. The first sections of all the field-coils are connected in series with each other in one group, and the group is then connected to the second group by the second sections of all the field-coils, the last section of the last group being connected to the first section of the first group. All the several sections are thus placed in series in a closed circuit. The points of connection between one section of the last field-coil and the following section of the first field-coil is connected to a segment of the commutator C. This commutator is provided with twenty-four segments in four groups of six segments each, the corresponding segments of each group being electrically connected. Thus there is one group per pair of poles, and each group corresponds to the six-part commutator shown in Fig. 2. T represents a transformer having its primary connected to the armature-circuit and its secondary connected to the brushes B B B. The transformer T may be a simple potential-transformer, as indicated, or it may be any one of the several arrangements of compounding-transformers which are now well known in the art. By means of the polyphase currents impressed upon the commutator-brushes a constant unidirectional flux is produced in each field-pole, and the machine consequently operates in exactly the same manner as though the field were excited by direct current. In this manner the machine may be self-exciting or self-compounding, or both, and with very little change from the standard construction of synchronous alternating-current machines.

Other applications of my invention will readily occur to those skilled in the art. The number of sections of the winding and the number of phases may be varied as desired. Furthermore, although a single winding is sufficient for producing a constant flux a greater number of windings may be used, if desired. Accordingly I do not desire to limit myself to the particular construction and arrangement of parts shown, but aim in the appended claims to cover all modifications which are within the scope of my invention.

What I claim as new, and desire to secure by Letters Patent of the United States, is—

1. In combination, a magnetic circuit, and means for producing therein a plurality of magnetomotive forces each varying as the square of a sine function.

2. In combination, a magnetic circuit, and means for producing therein a plurality of superimposed magnetomotive forces varying respectively as the squares of the sines of the phase angles of a polyphase system.

3. In combination, a magnetic circuit, an exciting-winding therefor, means for impressing on said winding polyphase voltages, and means for varying the number of effective turns connected to each phase of said voltages at the same rate as that at which the voltage of that phase varies.

4. In combination, a magnetic circuit, an exciting-winding therefor, means for impressing on said winding polyphase voltages, and means for varying the number of effective turns connected to each phase of said voltages as the sine of the phase angle of the voltage of that phase.

5. In combination, a magnetic circuit, an exciting-winding therefor provided with a many-part commutator, the number of turns of the several sections connected between adjacent segments of the commutator varying progressively in accordance with a sine function, and means for supplying polyphase currents to said commutator.

6. In combination, a magnetic circuit, an exciting-winding therefor provided with a many-part commutator, the number of turns of the several sections connected between adjacent segments of the commutator varying progressively in accordance with a sine function, brushes bearing on said commutator, said commutator and brushes being relatively movable, and means for supplying to said brushes polyphase currents of a frequency corresponding to the speed of relative rotation of said brushes and commutator.

7. In combination, a magnetic circuit, an exciting-winding therefor provided with a many-part commutator, the number of turns of the several sections connected between adjacent segments of the commutator varying progressively in accordance with a sine function but the resistance of the several sections being approximately equal, and means for supplying polyphase currents to said commutator.

8. In a dynamo-electric machine, a polyphase armature, a field-magnet, and means for producing in said field-magnet a plurality of superimposed magnetomotive forces each varying as the square of the sine of the phase angle of one of the phases of the armature-current.

9. In a dynamo-electric machine, a polyphase armature, a field-magnet, a field-winding carried thereby, means for impressing on said winding polyphase voltages derived from the armature, and means for varying the number of effective turns connected to each phase of said impressed voltages as the sine of the phase angle of the voltage of that phase.

10. In a dynamo-electric machine, a field-magnet provided with projecting poles, field-coils thereon arranged in sections varying in regard to number of turns in accordance with a sine function, a many-part commutator connected to the field-winding, and means for supplying polyphase currents to said commutator.

11. In a dynamo-electric machine, a field-magnet provided with projecting poles, field-coils thereon arranged in sections varying in regard to number of turns in accordance with a sine function, similar sections of all the coils being connected in a group and all the groups being connected in series in a closed circuit, a many-part commutator connected to the points of connection between the several groups, and means for supplying polyphase currents to said commutator.

12. In a dynamo-electric machine, a field-magnet provided with projecting poles, field-coils thereon arranged in sections varying in regard to number of turns in accordance with a sine function but the resistance of all the sections being approximately equal, a many-part commutator connected to the field-winding, and means for supplying polyphase currents to said commutator.

13. In a dynamo-electric machine, a field-magnet provided with projecting poles, field-coils thereon arranged in sections varying in regard to number of turns in accordance with a sine function, similar sections of all the coils being connected in a group and all the groups being connected in series in a closed circuit and the resistance of all the groups being approximately equal, a many-part commutator connected to the points of connection between the several groups, and means for supplying polyphase currents to said commutator.

14. In combination, a magnetic circuit, an exciting-winding therefor provided with a many-part commutator, the number of turns of the several sections of said winding connected between adjacent segments of the commutator varying with a sine function, and a polyphase arrangement of brushes bearing on said commutator.

15. In an alternating-current dynamo-electric machine, a field-magnet provided with projecting poles, field-coils thereon arranged in sections varying in regard to number of turns in accordance with a sine function, a many-part commutator connected to the field-winding, and a polyphase arrangement of brushes bearing on said commutator.

In witness whereof I have hereunto set my hand this 8th day of September, 1904.

MARIUS C. A. LATOUR.

Witnesses:
G. C. HOLLISTER,
HELEN ORFORD.